E. E. FREDERICK.
NEEDLE VALVE STRUCTURE.
APPLICATION FILED JUNE 16, 1911.
1,064,894. Patented June 17, 1913.
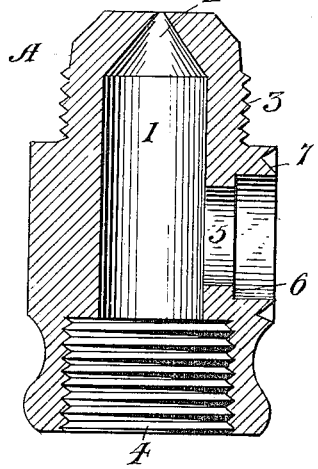
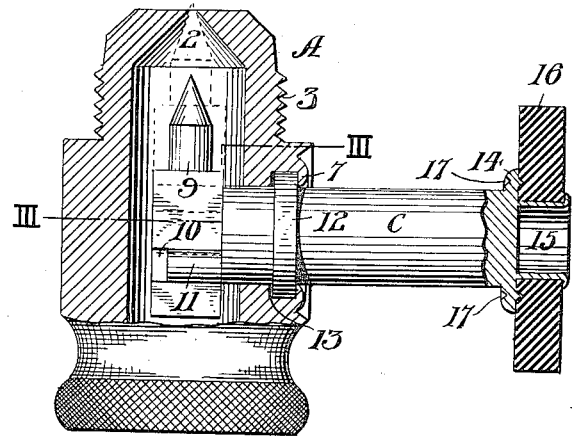
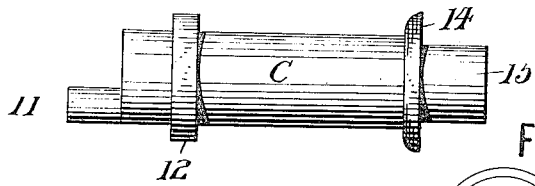
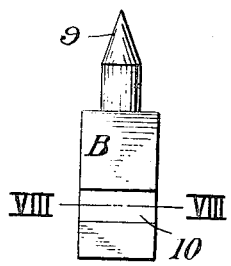
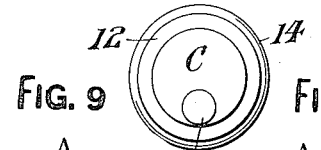
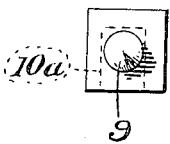
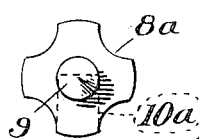

UNITED STATES PATENT OFFICE.

EDWIN E. FREDERICK, OF BRIDGEVILLE BOROUGH, PENNSYLVANIA, ASSIGNOR TO THE FREDERICK-ELDER COMPANY, OF BRIDGEVILLE, PENNSYLVANIA, A CORPORATION OF PENNSYLVANIA.

NEEDLE-VALVE STRUCTURE.

1,064,894.  Specification of Letters Patent.  Patented June 17, 1913.

Application filed June 16, 1911. Serial No. 633,551.

*To all whom it may concern:*

Be it known that I, EDWIN E. FREDERICK, a citizen of the United States, and residing in the borough of Bridgeville, in the county of Allegheny and State of Pennsylvania, have invented or discovered new and useful Improvements in Needle-Valve Structures, of which the following is a specification.

My invention consists of a new and improved valve structure intended for the control of the flow of gas or other fluid. It is especially intended for use in connection with gas burners used for illumination.

Generally speaking, it is comprised of a casing, provided with a tubular bore and a tapered discharge orifice, in which is slidingly mounted a needle valve adapted to control said orifice. The movement of said needle valve is controlled by an eccentric pin engaging a recess or slot in said valve and mounted on an operating shaft extending through the wall of said casing. Novel means are shown for securing said shaft in place and maintaining a gas-tight joint therewith. On the outer end of said shaft I mount a small wheel or member which may be readily grasped by the fingers to regulate the valve. Novel means for mounting said wheel and securing the same rigidly in place are shown.

In the accompanying drawings, Figure 1 is a longitudinal section of the casing; Fig. 2 is a similar view with the valve and controlling shaft in place in full; Fig. 3 is a cross section along the line III—III in Fig. 2; Fig. 4 is a side elevation of the operating shaft; Fig. 5 is an end view of the shaft; Fig. 6 is a side elevation of the needle valve; Fig. 7 is a plan view of the same; Fig. 8 is a cross section of the same along the line VIII—VIII in Fig. 6; Fig. 9 is a side elevation of a modified form of needle valve; Fig. 10 is a plan view of the same; Fig. 11 is a side elevation of another form of needle valve, and Fig. 12 is a plan view of the same.

The following is a detailed description of the drawings:

A is the casing, B the needle valve and C the operating shaft, the material of which the same are made being preferably brass. The casing A is tubular, having a central bore 1 which is tapered at the discharge end to form the orifice 2. Adjacent to the discharge end the casing A is provided with an exteriorly threaded portion 3 for attachment to the mixer or other portion of the burner, and the other end of bore 1 is interiorly threaded, as at 4 for the attachment of the gas-supply pipe. The lower portion of bore 1 is intersected by passage 5 through the wall of casing A, the inner portion of said passage being of somewhat reduced diameter, forming a shoulder 6 in said passage. The material of the casing A surrounding the outer mouth of passage 5 is cut or grooved to form an annular lip 7, constituting the inner wall of said groove, which latter is annular in horizontal section and V-shaped in transverse section. The groove is efficacious, as it assists or guides the upsetting-tool or die, and limits the upsetting movement thereof.

The needle valve B is composed of a body portion 8, preferably of substantially square cross section, of the proper size to slide freely in the bore 1 of casing A. Mounted on body 8 is the needle 9 adapted to control the orifice 2 by means of the longitudinal movement of the body 8. The face of body 8 which is toward the passage 5 is provided with a transverse slot 10.

The shaft C is of proper diameter to enter the reduced portion of passage 5 and is provided on its end with an eccentric wrist-pin 11 which is adapted to be seated in the slot 10 in the valve B. The rotation of the shaft C will raise and lower the valve B in the casing A, the wrist-pin 11 traversing said slot from side to side as the shaft C rotates. Adjacent to the end of the shaft C which is provided with the wrist-pin, said shaft is also provided with an annular collar 12 of proper diameter to enter the outer and enlarged portion of passage 5 and to bear against the shoulder 6 when the wrist-pin 11 is engaging the slot 10 in the valve B. A gasket, 13, of asbestos or other compressible material, is introduced between the shoulder 6 and the face of collar 12, and the lip 7 is then upset and compressed down against the exterior face of said collar 12 which is preferably of sufficient thickness to fill the outer portion of the passage 5. I thus obtain a perfectly gas-tight joint between the casing A and the shaft C and retard the rotation of such shaft just sufficiently to prevent its accidental rotation and the consequent disturbance of the adjustment of the needle 9.

To enable the shaft C to be conveniently rotated with the fingers, I provide such shaft adjacent to its outer end with an annular flange 14, and beyond such flange I reduce the diameter of the shaft and make the same tubular, as at 15.

16 is a small wheel or other member which is mounted on the end 15 of the shaft C and bears against the flange 14. Said wheel is preferably made of fiber or other suitable material. The tubular end 15 of said shaft is now expanded and upset against the face of the wheel 16 and in the same operation the material of the flange 14 is preferably indented as at 17—17 to enter the body of the wheel 16 and prevent its rotation.

In Figs. 9, 10, 11 and 12 I have shown a closed ended recess 10$^a$ substituted for the open slot 10 in the face of body 8 of the valve C, which arrangement may be adopted with good results, although I find the open slot 10 easier to construct. The gas flows freely along the casing A past the faces of the needle valve B, owing to the tubular form of the bore 1 and the square form of the body 8, but I may, as in Figs. 11 and 12, make the body 8 of the needle valve cylindrical and of sufficient diameter to slidingly fit the bore 1 of casing A, providing for the passage of the gas past the body of the needle valve by means of longitudinal groove 8$^a$—8$^a$.

The advantages of my improved valve structure are manifold. Among them may be mentioned the following: The movement of the needle valve is positively controlled by the operating shaft, requiring the use of no springs or other resilient members to assist. I am thus enabled to reduce the number of parts required, thus working an economy in manufacture, and obtaining more reliable operation. The method of attaching the operating shaft to the casing enables me to obtain a gas-tight joint without the use of threaded engagements which are expensive and soon wear loose in soft metal, thus impairing the operation of the shaft and allowing gas to escape. There is no longitudinal movement of my operating shaft but the same is held positively and permanently in position in such a manner that it will not work loose and thus render the valve inoperative. The method of attaching the wheel to the shaft is cheap and is permanent.

The entire structure is inexpensive, neat in appearance, efficient in operation, and extremely durable.

What I desire to claim is—

In a gas-valve, a valve-casing, a valve-operating shaft projecting through said casing, a valve disposed in said casing and controlled by said shaft, an annular collar carried by said shaft, and an annular lip carried by said casing and upset against said collar, holding the shaft against removal and providing a gas-tight joint.

Signed at Pittsburgh, Pennsylvania, this 13th day of June, 1911.

EDWIN E. FREDERICK.

Witnesses:
 EDWARD A. LAURENCE,
 A. W. FORSYTH.